United States Patent [19]

Motoyama

[11] Patent Number: 5,774,678
[45] Date of Patent: *Jun. 30, 1998

[54] METHOD AND APPARATUS FOR CONTROLLING AND COMMUNICATING WITH BUSINESS OFFICE DEVICES

[75] Inventor: Tetsuro Motoyama, Cupertino, Calif.

[73] Assignees: Ricoh Company, Ltd., Tokyo, Japan; Ricoh Corporation, San Jose, Calif.

[*] Notice: The term of this patent shall not extend beyond the expiration date of Pat. No. 5,544,289.

[21] Appl. No.: 852,413

[22] Filed: May 7, 1997

Related U.S. Application Data

[63] Continuation of Ser. No. 698,068, Aug. 15, 1996, Pat. No. 5,649,120, which is a continuation of Ser. No. 562,192, Nov. 22, 1995, Pat. No. 5,568,618, which is a continuation of Ser. No. 473,780, Jun. 6, 1995, Pat. No. 5,544,289, which is a continuation of Ser. No. 426,679, Apr. 24, 1995, Pat. No. 5,537,554, which is a continuation of Ser. No. 282,168, Jul. 28, 1994, Pat. No. 5,412,779, which is a continuation of Ser. No. 902,462, Jun. 19, 1992, abandoned, which is a continuation of Ser. No. 549,278, Jul. 6, 1990, abandoned.

[51] Int. Cl.⁶ ...................................................... G06F 13/00
[52] U.S. Cl. ............................... 395/280; 358/442; 399/2
[58] Field of Search ............................... 395/280, 183.22, 395/856; 355/203, 204, 205, 207; 358/442; 399/2

[56] References Cited

U.S. PATENT DOCUMENTS

| | | | |
|---|---|---|---|
| 4,947,345 | 8/1990 | Paradise et al. | 358/442 |
| 4,965,676 | 10/1990 | Ejiri et al. | 358/406 |
| 5,361,265 | 11/1994 | Weinberger et al. | 395/184.01 |
| 5,544,289 | 8/1996 | Motoyama | 395/280 |

Primary Examiner—Glenn A. Auve
Attorney, Agent, or Firm—Oblon, Spivak, McClelland, Maier & Neustadt, P.C.

[57] ABSTRACT

A method and apparatus for controlling and communicating with business office devices, such as copiers, facsimiles and/or printers. The present invention communicates and controls various modules of business devices which allow an external device such as an operation panel to access the state of a target device, such as a copier, printer or facsimile. The operation panel can communicate with the target device and control the same target device. Also, a remote diagnostics station can provide remote diagnostics of the target device.

41 Claims, 6 Drawing Sheets

TYPE

INFORMATION
00 NORMAL
01 ERROR
10 COMPOSITE
11 URGENT

TYPE NUMBER
1-30 TYPE
11111 EXTENSION.....00H 00H

LENGTH

FOLLOWING K BYTES SPECIFY THE LENGTH

...00H 00H

INDEFINITE

| Engine | Panel | Data | Comment |
|---|---|---|---|
| Power On | Power On | | |
| 1 ←----- | | 02, 81, 02 | Identifying as Ope. Panel Engine is busy for power-on reset |
| 2 -----→ | | 02, 81, 01 | Engine identifying itself |
| 3 ←----- | | 01, 81, 02 | Ack Identify (02) |
| 4 ←----- | | 02, 81, 02 | First Identify timed out. Try again |
| 5 -----→ | | 01, 81, 02 | Ack Identify (02) Connection established. |
| 6 ←----- | | 03, 81, 04 | # of copies specified. |
| 7 -----→ | | 01, 81, 03 | Ack # of copies (03) |
| 8 ←----- | | 04, 80 | Start |
| 9 -----→ | | 01, 81, 04 | Ack Start (04) |
| 10 -----→ | | 61, 80 | Paper Jam |
| 11 ←----- | | 01, 81, 61 | Ack Paper Jam |

FIG.-4

| ENGINE | DIAG. | DATA | COMMENT |
|---|---|---|---|
| 1 | ----> | 02, 81, 03 | IDENTIFYING DIAGNOSTIC SYSTEM |
| 2 | <---- | 01, 81, 02 | ACK IDENTITY |
| 3 | ----> | 06, 81, 01 | INQUIRY IDENTITY |
| 4 | <---- | 41, 86, 01, 81, 06, 07, 81, 01 | COMPOSITE ACK. ACK INQUIRY & REPORT MODEL = 1 |
| 5 | ----> | 06, 81, 02 | INQUIRY MODEL |
| 6 | <---- | 41, 86, 01, 81, 06, 07, 81, 02 | COMPOSITE ACK. ACK INQUIRY & REPORT MODEL = 2 |
| 7 | ----> | 09, 84, 00, 01, 00, 02 | PARAMETERS (1, 2) REPORT |
| 8 | <---- | 21, 81, 09 | COMMAND NOT UNDERSTOOD |
| 9 | ----> | 08, 84, 00, 00, 01, C1 | REPORT ADDRESS (01C1) CONTENT |
| 10 | <---- | 01, 81, 08 | ACK |
| 11 | ----> | 07, 87, 00, 00, 01, C1, 3D, FF | REPORT 01C1 = FF |
| 12 | <---- | 01, 81, 07 | ACK |

*FIG. 5*

METHOD AND APPARATUS FOR CONTROLLING AND COMMUNICATING WITH BUSINESS OFFICE DEVICES

This is a Continuation of application Ser. No. 08/698,068, filed on Aug. 15, 1996, now U.S. Pat. No. 5,649,120 which is a Continuation of 08/562,192, filed on Nov. 22, 1995, now issued as U.S. Pat. No. 5,568,618, which is a Continuation of application Ser. No. 08/473,780 filed on Jun. 6, 1995, now issued as U.S. Pat. No. 5,544,289, which is a Continuation of application Ser. No. 08/426,679, filed on Apr. 24, 1995, now issued as U.S. Pat. No. 5,537,554, which is a Continuation of application Ser. No. 08/282,168, filed on Jul. 28, 1994, now issued as U.S. Pat. No. 5,412,779, which is a Continuation of application Ser. No. 07/902,462, filed on Jun. 19, 1992, now abandoned, which is a Continuation of application Ser. No. 07/549,278, filed on Jul. 6, 1990, now abandoned.

BACKGROUND OF THE INVENTION

The present invention relates to a method and apparatus for communicating and controlling various types of business office equipment or devices transparently and uniformly. The types of business equipment could be copiers, facsimiles and/or printers.

The creation of business office devices such as a copier, facsimile or printer requires activities assigned to various groups which must be integrated into at a certain time. In addition, once the device goes to customers, it must be maintained by a field service group. Therefore, different groups of people work together to develop and maintain the product.

The current trend of using microprocessors in business devices increased the capability of the devices. For example, high speed copiers usually have more than one microprocessor performing various tasks, including an operation panel consisting of many buttons and displays, controlled by a microprocessor.

As the use of microprocessors increases, a shortage of software engineers becomes critical. Fathi and Armstrong (1985) showed the cost ratio of development between hardware and software as 1 to 5.3. The current practice of developing devices, particularly stand-alone devices such copiers, tends ignore reusability of software across different models. For example, an operation panel of a copier is programmed by an engineer who develops the software of the main controller. The software is closely tied to a particular model and usually cannot be used by other copier models. If this trend does not change, the development of various modules by different groups cannot be easily integrated. Moreover, the shortage of software engineers is likely to limit the number of product developments and modification.

SUMMARY OF THE INVENTION

The foregoing problems can be solved and product development cycles can be shortened by providing a means and corresponding method to communicate and control various modules of a device across models and products. This allows several groups to start developing modules using existing devices rather than waiting for a target device to be developed. In addition, field service organization can support diagnostic and maintenance activities with one intelligent system, rather than having different systems for various products.

It is therefore an object of the present invention to provide an improved means and method of allowing an external device or devices to access the state of the target device(s), to communicate with the target device(s) and to control the target device(s).

Additional objects, advantages and novel features of the present invention will be Bet forth in part in the description which follows and in part become apparent to those skilled in the art upon examination of the following or may be learned by practice of the invention. The objects and advantages of the present invention may be realized and attained by means of the instrumentalities and combinations which are pointed out in the appended claims.

BRIEF DESCRIPTION OF THE DRAWINGS

The accompanying drawings which are incorporated in and form a part of this specification illustrate and embodiment of the invention and, together with the description, serve to explain the principles of the invention.

FIG. 4 depicts an example of a handshake between a copier engine and operation panel after power-up.

FIG. 5 depicts an example of how a diagnostic station can be connected in accordance with the present invention.

DETAILED DESCRIPTION OF THE INVENTION

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
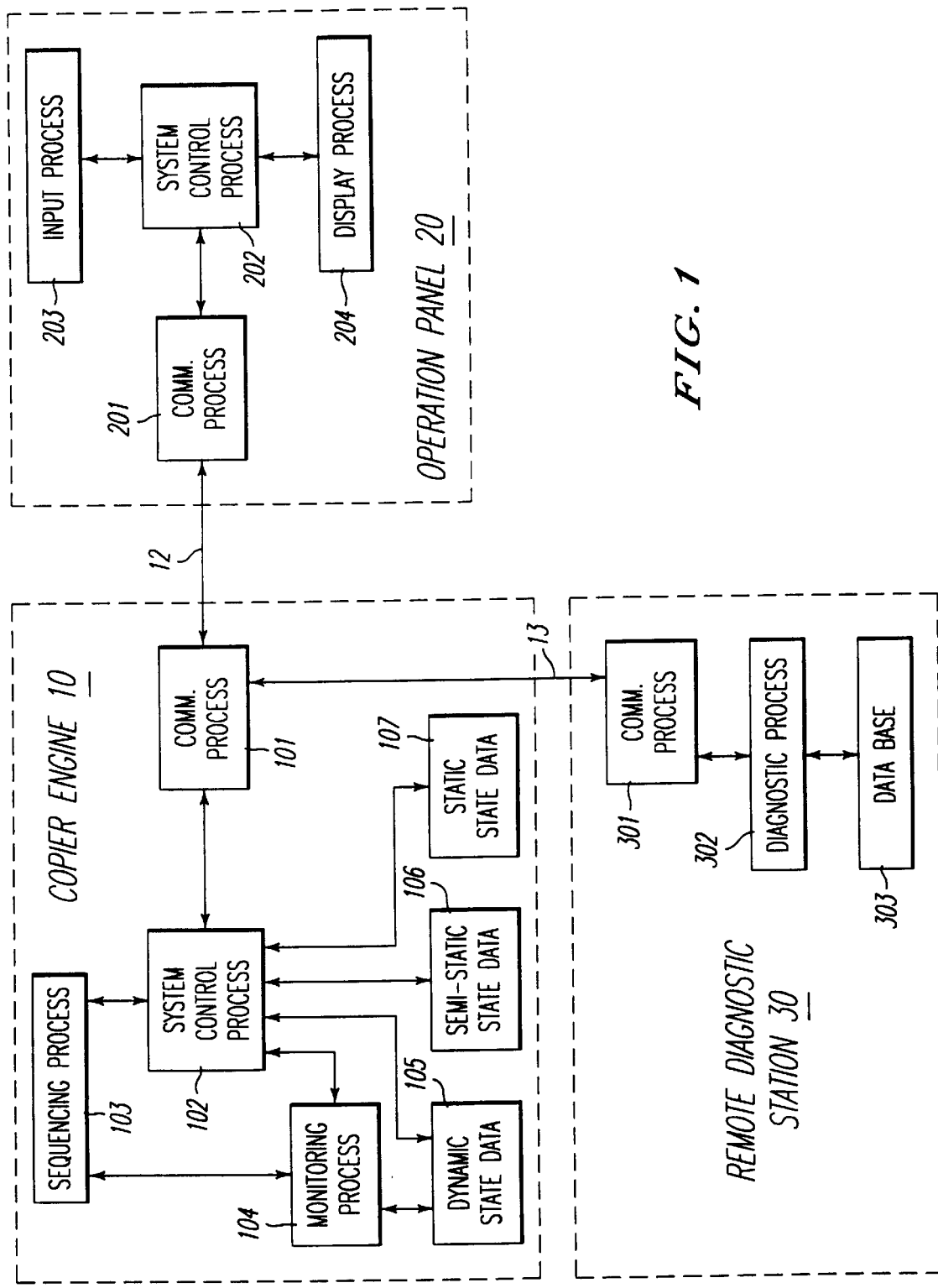
FIG. 1 depicts a functional system overview under which the present invention can be applied.

FIG. 1 illustrates a preferred embodiment of the present invention including a copier engine 10, operation panel 20, remote diagnostic station 30. However, the present invention is not limited to copier devices, and can be applied to other business equipment devices, such as a printer which, for example, receives character codes representing characters and prints characters which correspond to the character codes, or facsimile, which has means which are described below.

In the following illustration, the target device in FIG. 1 is a copier engine 10. The target device 10 includes therein means to store Static State Data 107, which does not change over the life of the device, such as the model number, serial number, model characteristics and the like. Target device 1D includes means to store Semi-Static State Data 106, which may change over the life of the device infrequently, such as the ROM version, option configuration, and the like.

In addition, the target device has means to store Dynamic State Data 105, which changes according to the mechanical state of the device, such as the paper status in the tray, oil, toner, number of prints, sensitivity of the photo-receptor, paper path and location, and the like. In order to store the dynamic state of the device, the target device includes Monitoring Process 104 to monitor the state of device 10. Overall system activities are coordinated by System Control Process 102.

At power-on time, System Control Process 102 not only brings up the target device 10, but also establishes the communication with attached devices by first checking the physical connection and then establishing the communication by means which will be described below.

Copier engine 10 is idle until a user specifies some function through Operation Panel 20. During the idle time, however, System Control Process 102 continuously monitors its state through Monitoring Process 104. If abnormal states are detected, System Control Process 102 sends data to Communication Process 101, which codes data- and sends the coded data to the Operation panel 20 through communication media line 12. Communication Process 201 sends acknowledgement decodes data and sends it to System Control Process 202. System Control Process 202 then notifies the state of Copier Engine 10 through Display Process 204.

If communication line 13 to Remote Diagnostic Station is connected, System Control Process 102 can send a message to get the attention of Remote Diagnostic Station 30 to notify station 30 of an abnormal state.

Input Process 203 receives input from a user and sends the data to System Control Process 202, which then echoes back the input through Display Process 204, so that the user can get feedback of his/her inputs The data from the user is then coded in Communication Process 201. The coded data is then sent to Copier Engine through line 12.

Communication Process 101 then sends an acknowledgement to 201, decodes the received data and sends the decoded data to System Control Process 102. During the actual copying, Sequencing Process 103 sequences events according to timing requirements. Remote Diagnostic Station 30 is connected with Copier Engine 10 through line 13, which can be a telephone line, RS232 line, or any other suitable communication means. Communication process 301 acts similarly as process 101 and process 201 of engine 10 and panel 20, respectively.

Diagnostic Process 302 is an intelligent process which can communicate interactively with Copier engine 10 based upon the responses it receives and data accumulated in the Data Base 303.

Figure 2:
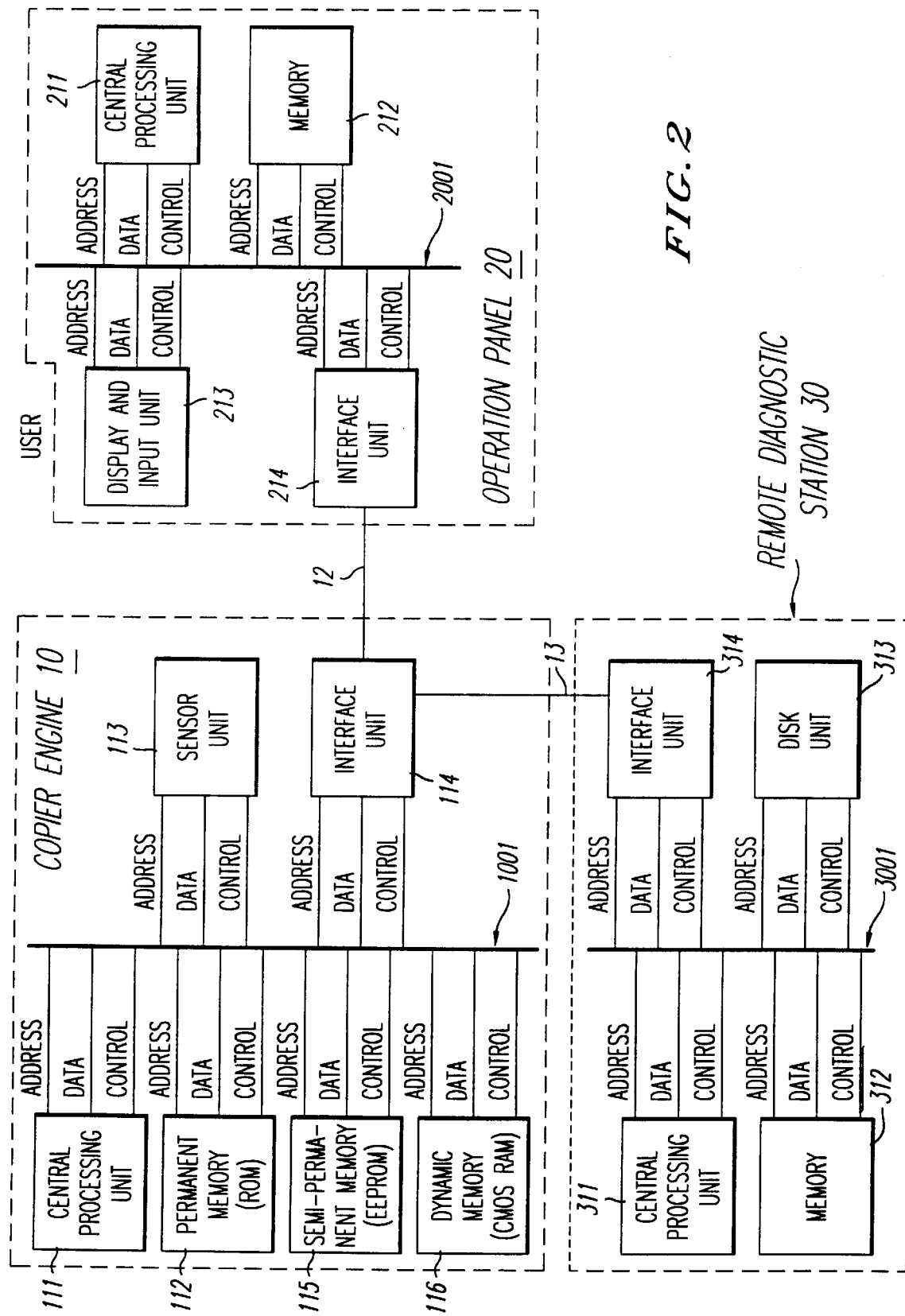
FIG. 2 depicts the hardware aspects of an implementation of the present invention.

FIG. 2 illustrates hardware features utilized to implement the present invention. All devices 10, 20, 30 have buses 1001, 2001, and 3001, which connect Interface Units 114, 214, and 314 respectively. Depending upon the model, a bus could have more units. Sensor unit 113 senses the mechanical states of the target de-vice which be stored as Dynamic Data, such as paper tray, voltage and paper path.

Memory 112 holds Static State Data 107 as a permanent memory (such as ROM). Memory 115 stores Semi-Static State Data 106 in changeable memory which does not require power, such as EEPROM, or which uses low power and can be supported by a battery (CMOS RAM). Memory 116 stores Dynamic State Data 105 in a changeable memory, Which does not require power or which uses low power and can be supported by a battery.

Display and Input Unit 213 controls input keys and displays, such as lights and LCD. Disk unit 313 holds the data base. If the communication line 13 is not connected regularly or gets connected only when diagnostics are needed, the Interface Unit 114 has a means to notify Central Processing Unit 111 that line 13 is connected, such as an interrupt caused by mechanical means of physical connection.

Figure 3:
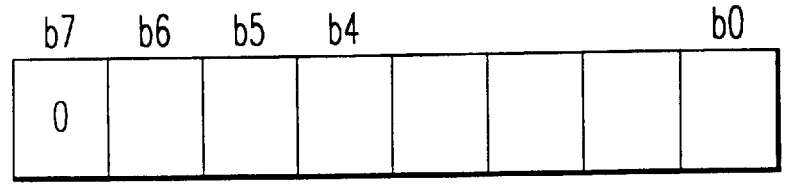
FIG. 3 depicts an encoding scheme which can be used for communication with the present invention.
Figure 3:
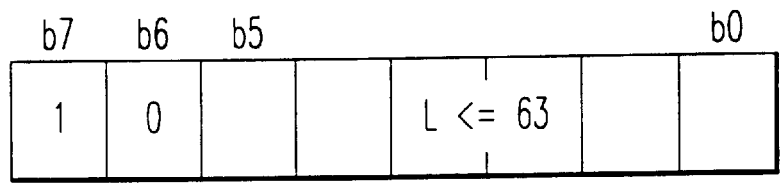
Figure 3:
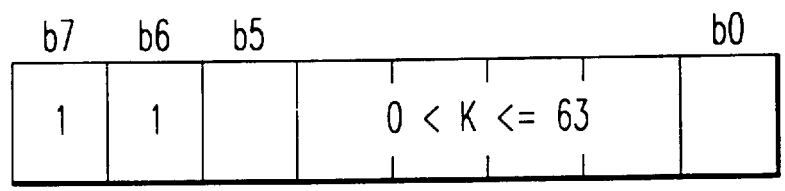
Figure 3:
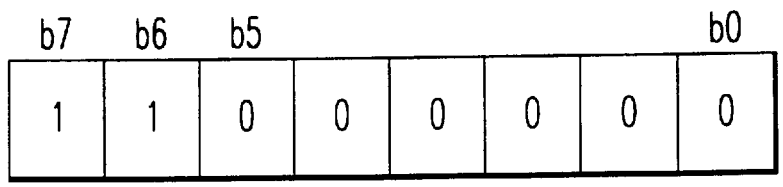

FIG. 3 illustrates a preferred embodiment of encoding according to the present invention. However, other encoding such as ASN.1 (1987) can be used instead. The encoding scheme in FIG. 3 consists of sending Type, Length and Value (TLV) encoding. Bit 7 of Type is set to 0 while bit 7 of Length is set to 1. Values can take any bit combination. The encoding is binary to save the length of the data communication. Combined with the information field, up to 120 types (4 information×30 types) can be defined. One method to extend the type is to set all low 5 bits to 1. The terminator of this extension is two bytes of 00H. Using Composite in the information field, more than one information can be sent as follows:

010xxxxx L1 T2 L2 V2 T3 L3 V3 where L1 is the byte length of T2 through V3. —L2 is the byte length of V2, and L3 is the byte length of V3. Composite is not limited to two. Table 1 below shows codes for Type and Value. These codes are shown as an illustration, and actual implementation may vary depending upon the application.

TABLE I

| Information | Type | Content |
|---|---|---|
| \multicolumn{3}{|l|}{Type and Value} |
| 00 | 1 | Acknowledgement |
| 00 | 2 | Identify |
| 00 | 3 | # of Copies |
| 00 | 4 | Start |
| 00 | 5 | Done |
| 00 | 6 | Inquiry |
| 00 | 7 | Report |
| 00 | 8 | Address Content Report |
| 00 | 9 | Parameter Report |
| 01 | 1 | Command Not Understood |
| 10 | 1 | Composite Acknowledgement |
| 11 | 1 | Jam |
| \multicolumn{3}{|l|}{Identify Values} |
| | 1 | Copier Engine |
| | 2 | Operation Panel |
| | 3 | Diagnostic |
| \multicolumn{3}{|l|}{Inquiry Values} |
| | 1 | Identity |
| | 2 | Model |

FIG. 4 illustrates the establishment of communication between engine 10 and operation panel 20 of FIGS. 1 or 2 after power-on. Both engine 10 and operation panel 20 go through power on reset sequence. At step 1, operation panel 20 finishes the reset and sends its assigned value to engine 10. However, engine 10 is still busy with reset and cannot receive the data through the interface unit 101. step 2, engine 10 is ready and sends the assigned value to panel 20. Step 3 shows the acknowledgement from panel to engine 10. In a preferred embodiment, the receiving side must return the acknowledgement with the received Type.

In FIG. 4, step 4 illustrates that a First Identify has timed out and another attempt should be made.

Step 5 illustrates that the connection has been established.

Step 6 illustrates an example of the number of copies specified and the acknowledgement in step 7 reflects the number of copies (here, 3 copies).

Step 8 illustrates the start of the copying sequence, and step 9 indicates the corresponding acknowledgement.

Step 10 illustrates the communication of a paper jam, and step 11 illustrates the corresponding acknowledgement of that paper jam.

FIG. 5 illustrates the process of establishing the connection between Diagnostic Station 30 and Copier Engine 10 of FIGS. 1 and 2. It is assumed that the engine power is on. FIG. 5 illustrates the use of Composite information field on lines 4 and 6. If Composite is not used, communication such as lines 10 through 12 is needed.

Step 1 in FIG. 5 illustrates the identifying diagnostic, system and step 2 illustrates the acknowledgement of the identification.

Step 3 illustrates the identification inquiry, and step 4 illustrates a composite acknowledgement.

Step 5 inquires as to the model identification, and step 6 is the corresponding acknowledgement.

Step 7 asks for a report of parameters and, as an illustration, step 8 illustrates the command is not understood.

Step 9 illustrates a reporting of address, and steps 10, 11 and 12 reflect the acknowledgement, report and acknowledgement, respectively.

Figure 6:
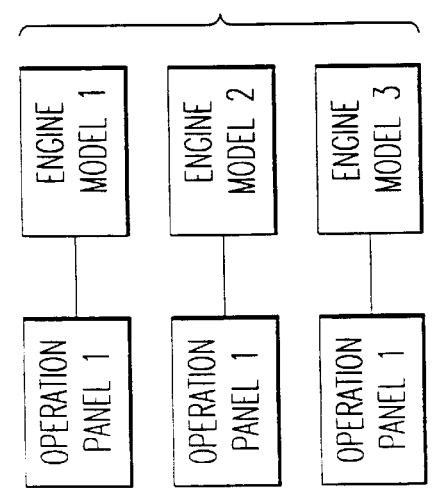

FIG. 6 shows an example of another embodiment of the present invention in which an operation panel 1 can control different types of engine models identified as Engine Model 1, Model 2 and Model 3.

Figure 7:
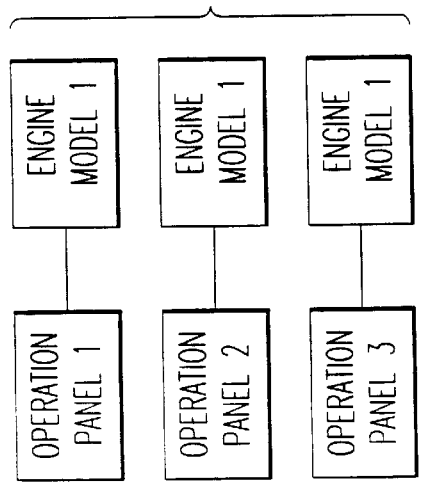

FIG. 7 shows an embodiment of the invention in which different operation panels such as panels 1, 2 or 3 can control the same engine models identified as engine model 1.

Figure 8:
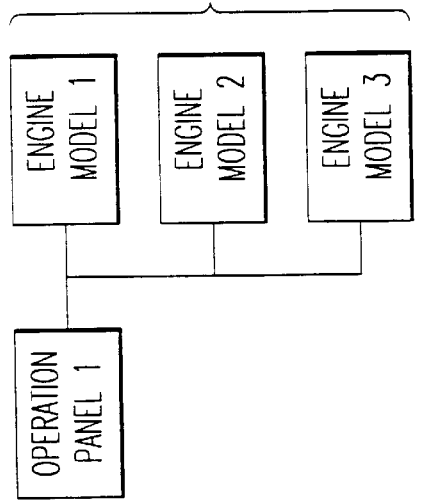
FIGS. 6–8 show examples of other embodiments of the present invention.

Finally, FIG. 8 shows an operation panel 1 controlling different engine models, identified as engine models 1, 2 and 3. In FIG. 8, operation panel 1 could control models 1, 2 or 3 by a suitable bus interconnection and suitable multiplexing capability.

In conclusion, the present invention provides a means and corresponding method for controlling, monitoring and communicating with office equipment devices by using the following:

Means to control various activities of the system (System Control Process)

Means to store static data (Static State Data)

Means to store semi-static data (Semi-Dynamic State Data)

Means to store dynamic data (Dynamic State Data)

Means to monitor the state of the device (Monitoring Process)

Means to get the state of device from the monitoring means and store the state into the storage of dynamic data (Monitoring Process→System Control Process)→Dynamic State Data)

Means to communicate with other devices such as RS232 or modem/telephone (Communication Process)

Means to identify itself to other devices (Communication Process)

Means to exchange commands and data such as reply (Communication Process)

Means to interpret commands (System Control Process)

Means to take actions based upon the commands (System Control Process)

Means to send results of actions (System Control Process→Communication Process)

Means to notify when the new communication line is established (Communication Process→System Control Process: Interface Unit—interrupt→CPU)

The foregoing description of the preferred embodiment of the present invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the present invention be defined only by the claims appended hereto.

What is claimed is:

1. A method of communicating between a business office device and a remote computer, comprising the steps of:

storing static state data representing a characteristic of said office device which does not change over a life of the business office device;

storing semi-static state data representing a characteristic of said business office which infrequently changes over a life of the business office device;

storing dynamic state data representing a characteristic of the business office device which changes according to at least one of a mechanical and an electrical state of the business office device;

transmitting the static state data from the business office device to the remote computer;

transmitting the semi-static state data from the business office device to the remote computer; and transmitting the dynamic state data from the business office device to the remote computer.

2. A method according to claim 1, further comprising the steps of:

receiving the static state data by the remote computer;

receiving the semi-static state data by the remote computer; and receiving the dynamic state data by the remote computer.

3. A method according to claim 1, further comprising the step of:

processing at least one of the static, semi-static, and dynamic data by the remote computer.

4. A method according to claim 3, further comprising the step of:

transmitting data used to control the business office device from the remote computer to the business office device after the processing step.

5. A method according to claim 4, wherein the step of transmitting data used to control the business office device comprises:

transmitting the data used to control the business office device to the business office device which is a printer.

6. A method according to claim 4, wherein the step of transmitting data used to control the business office device comprises:

transmitting the data used to control the business office device to the business office device which is a copier.

7. A method according to claims 1 or 4, wherein the step of transmitting the static state data comprises:

transmitting the static state data which is a model number of the business office device.

8. A method according to claims 1 or 4, wherein the step of transmitting the static state data comprises:

transmitting the static state data which is a serial number of the business office device.

9. A method according to claims 1 or 4, wherein the step of transmitting the static state data comprises:

transmitting a plurality of types of static state data from the business office device.

10. A method according to claims 1 or 4, wherein the step of transmitting the semi-static state data comprises:

transmitting the semi-static state data which is a ROM version.

11. A method according to claims 1 or 4, wherein the step of transmitting the semi-static state data comprises:

transmitting the semi-static state data which is an option configuration of the business office device.

12. A method according to claims 1 or 4, wherein the step of transmitting the dynamic state data comprises:

transmitting the dynamic state data which is a number of prints made by the business office device.

13. A method according to claims 1 or 4, wherein the step of transmitting the dynamic state data comprises:

transmitting the dynamic state data which a toner status of the business office device.

14. A method according to claim 1, wherein the business office device is a printer and the transmitting steps transmits each of the state data from the printer.

15. A method according to claim 1, wherein the business office device is a copier and the transmitting steps transmits each of the state data from the copier.

16. A method according to claims 1 or 4, further comprising the step of:

display each of the state data at the remote computer.

17. A method according to claims 1 or 4, wherein the step of transmitting the static state data comprises:

transmitting the static state data which is a model characteristic of the business office device.

18. A method according to claim. 1, wherein the step of transmitting the static state data comprises:

transmitting the static state data which is a model identification of the business office device.

19. A method of communicating between a business office device and a remote computer, comprising the steps of:

storing a plurality of types of static state data representing characteristics of said office device which do not change over a life of the business office device;

transmitting the plurality of types of static state data from the business office device to the remote computer; and displaying the plurality of types of static state data at the remote computer.

20. A method according to claim 19, further comprising the steps of:

processing the static state data by the remote computer; and transmitting data used to control the business office device from the remote computer to the business office device after the processing step.

21. A method according to claim 20, wherein:

the step of transmitting data transmits the data used to control the business office device to the business office device which is a printer.

22. A method according to claim 20, wherein:

the step of transmitting data transmits the data used to control the business office device to the business office device which is a copier.

23. A method according to claim 19, wherein the step of transmitting the static state data comprises:

transmitting the static state data which is at least two of a model number, a serial number, and model characteristics of the business office device.

24. A method according to claim 19, wherein the step of transmitting the plurality of types of static state data comprises:

transmitting one of the types of static state data which is a model identification of the business office device.

25. A method according to claim 24, wherein the step of transmitting the plurality of types of static state data comprises:

transmitting said one of the types of static state data which is a model identification of the business office device which is a printer.

26. A method according to claim 24, wherein the step of transmitting the plurality of types of static state data comprises:

transmitting said one of the types of static state data which is a model identification of the business office device which is a copier.

27. A method according to claim 19, wherein:

the remote computer is configured to control different types of printers.

28. A method according to claim 19, further comprising the step of:

controlling, by the remote computer, different types of printers.

29. A method according to claim 19, further comprising the step, performed before the transmitting and displaying steps, of:

turning on power to the business office device; and the method still further comprising the step, performed after the steps of turning on the power, transmitting, and displaying, of:

transmitting a start command from the remote computer to the business office device.

30. A method of communicating between a printer and a computer, comprising the steps of:

storing a model identification of the printer in the printer;

initiating communication between the printer and the computer by the computer;

transmitting the model identification of the printer from the printer to the computer; and receiving the model identification by the computer.

31. A method of communicating between a printer and a computer, comprising the steps of:

storing a model identification of the printer in the printer;

initiating communication between the printer and the computer by the printer;

transmitting the model identification of the printer from the printer to the computer; and receiving the model identification by the computer.

32. A method according to claims 30 or 31, wherein the storing step comprises:

storing the model identification which is static state data.

33. A method according to claims 30 or 31, wherein the storing step comprises:

storing the model identification which does not change over a life of the printer.

34. A method according to claims 30 or 31, wherein the storing step comprises:

storing static state data which does not change over a life of the printer.

35. A method according to claims 30 or 31, wherein the storing step comprises:

storing model identification static state data which does not change over a life of the printer.

36. A method of communicating between a copier and a remote computer, comprising the steps of:

storing a model identification of the copier in the copier;

initiating communication between the copier and the remote computer by the remote computer;

transmitting the model identification of the copier from the copier to the remote computer; and receiving the model identification by the remote computer.

37. A method of communicating between a copier and a remote computer, comprising the steps of:

storing a model identification of the copier in the copier;

initiating communication between the copier and the remote computer by the copier;

transmitting the model identification of the copier from the copier to the remote computer; and receiving the model identification by the remote computer.

38. A method according to claims 36 or 37, wherein the storing step comprises:

storing the model identification which is static state data.

39. A method according to claims 36 or 37, wherein the storing step comprises:

storing the model identification which does not change over a life of the copier.

40. A method according to claims 36 or 37, wherein the storing step comprises:

storing static state data which does not change over a life of the copier.

41. A method according to claims 36 or 37, wherein the storing step comprises:

storing model identification static state data which does not change over a life of the copier.

* * * * *

UNITED STATES PATENT AND TRADEMARK OFFICE
CERTIFICATE OF CORRECTION

PATENT NO. : 5,774,678

DATED : JUNE 30, 1998

INVENTOR(S) : MOTOYAMA

It is certified that error appears in the above-indentified patent and that said Letters Patent is hereby corrected as shown below:

In column 1, line 44, before "copiers," insert --as--.

In column 2, line 5, change "Bet" to --set--.

In column 2, line 58, after "device" change "1D" to --10--.

In column 2, line 67, after "target device" (second occurrence) insert --10--.

In column 3, line 17, after "acknowledgement" insert --,--.

In column 3, line 28, after "inputs" insert --.--.

In column 3, line 46, delete "30" (first occurrence).

UNITED STATES PATENT AND TRADEMARK OFFICE
CERTIFICATE OF CORRECTION

PATENT NO. : 5,774,678
DATED : JUNE 30, 1998
INVENTOR(S) : MOTOYAMA

It is certified that error appears in the above-indentified patent and that said Letters Patent is hereby corrected as shown below:

In column 3, line 50, delete "-" from "de-vice".

In column 3, line 50, after "which" insert --must--.

In column 4, line 52, before "step 2" insert --At--.

In column 5, line 7, after "identifying" insert --of the--.

Signed and Sealed this

Eighth Day of December, 1998

*Attest:*

BRUCE LEHMAN

*Attesting Officer*  *Commissioner of Patents and Trademarks*